(12) United States Patent
Kiselis et al.

(10) Patent No.: US 7,959,168 B2
(45) Date of Patent: Jun. 14, 2011

(54) SUSPENSION LINK WITH INTEGRAL PIVOT ASSEMBLY

(75) Inventors: Gregory P. Kiselis, Oak Ridge, NC (US); Jeffrey W. Nichols, Pinckney, MI (US)

(73) Assignee: Magna International Inc., Aurora (CA)

( * ) Notice: Subject to any disclaimer, the term of this patent is extended or adjusted under 35 U.S.C. 154(b) by 163 days.

(21) Appl. No.: 12/294,553

(22) PCT Filed: Apr. 4, 2007

(86) PCT No.: PCT/CA2007/000543
§ 371 (c)(1),
(2), (4) Date: Oct. 15, 2008

(87) PCT Pub. No.: WO2007/112576
PCT Pub. Date: Oct. 11, 2007

(65) Prior Publication Data
US 2009/0115155 A1 May 7, 2009

(51) Int. Cl.
B60G 21/05 (2006.01)
(52) U.S. Cl. .... 280/124.106; 280/124.107; 280/124.111
(58) Field of Classification Search ................. 403/220, 403/221, 222, 223, 224, 261; 280/124.1, 280/124.107, 124.116, 124.111, 124.134, 280/124.109
See application file for complete search history.

(56) References Cited

U.S. PATENT DOCUMENTS

| | | | |
|---|---|---|---|
| 3,089,710 A * | 5/1963 | Fiala | 280/124.107 |
| 3,123,348 A | 3/1964 | Hildebrandt | |
| 3,467,406 A | 9/1969 | Henry-Biabaud | |
| 4,491,436 A | 1/1985 | Easton | |
| 4,756,638 A * | 7/1988 | Neyret | 403/261 |
| 4,951,349 A * | 8/1990 | Dietrich et al. | 16/228 |
| 4,990,022 A * | 2/1991 | Watanabe et al. | 403/349 |
| 5,145,276 A * | 9/1992 | Demange | 403/349 |
| 5,261,758 A * | 11/1993 | Vranish | 403/348 |
| 5,275,529 A * | 1/1994 | Langenbrunner et al. | 415/119 |
| 5,320,443 A * | 6/1994 | Lien et al. | 403/154 |
| 5,368,427 A * | 11/1994 | Pfaffinger | 411/553 |
| 5,401,049 A | 3/1995 | Richardson | |
| 5,445,404 A | 8/1995 | Shida et al. | |
| RE35,123 E * | 12/1995 | Wagner | 296/35.1 |
| 5,505,479 A * | 4/1996 | Lee | 280/124.107 |
| 5,566,969 A | 10/1996 | Tattermusch | |
| 5,583,522 A * | 12/1996 | Radomski et al. | 343/715 |
| 5,597,260 A * | 1/1997 | Peterson | 403/319 |
| 5,619,810 A * | 4/1997 | Kasim | 37/399 |
| 6,000,875 A * | 12/1999 | Staniszewski | 403/370 |
| 6,099,190 A * | 8/2000 | Honobe et al. | 403/13 |
| 6,102,610 A * | 8/2000 | Palusis et al. | 403/388 |
| 6,142,494 A * | 11/2000 | Higuchi | 280/93.51 |
| 6,179,328 B1 | 1/2001 | Kawagoe et al. | |
| 6,200,223 B1 * | 3/2001 | Martens | 464/99 |

(Continued)

FOREIGN PATENT DOCUMENTS

DE 10130636 A1 1/2003

(Continued)

Primary Examiner — Paul N. Dickson
Assistant Examiner — Barry Gooden, Jr.

(57) ABSTRACT

A suspension for a motor vehicle having a hollow suspension member including first and second spaced apart sidewalls and a pivot pin. In the preferred embodiment, the pivot pin is a locking assembly that includes a first retainer partially insertable through a first window formed in the first sidewall and a second retainer partially insertable through a second window formed in the second side wall. The first retainer engages the second retainer to present a pivot that receives a pivot arm between the sidewalls.

38 Claims, 9 Drawing Sheets

U.S. PATENT DOCUMENTS

| | | | |
|---|---|---|---|
| 6,469,678 B1 * | 10/2002 | Pullen | 343/888 |
| 7,147,399 B2 * | 12/2006 | Viscount et al. | 403/349 |
| 7,338,057 B2 * | 3/2008 | Kropfl et al. | 280/124.134 |
| 7,635,138 B2 * | 12/2009 | Imre et al. | 280/124.116 |
| 7,789,405 B2 * | 9/2010 | Lie | 280/124.116 |
| 2004/0037635 A1 * | 2/2004 | Viscount et al. | 403/348 |
| 2004/0150182 A1 * | 8/2004 | Kropfl et al. | 280/124.107 |
| 2006/0237938 A1 * | 10/2006 | Imre et al. | 280/124.116 |
| 2007/0092333 A1 * | 4/2007 | Viscount et al. | 403/349 |
| 2008/0031685 A1 * | 2/2008 | Dupriest et al. | 403/225 |
| 2010/0038874 A1 * | 2/2010 | Varela et al. | 280/124.1 |

FOREIGN PATENT DOCUMENTS

| | | |
|---|---|---|
| EP | 827851 A1 | 3/1998 |
| EP | 1300265 A1 | 4/2003 |
| WO | WO 2004/110796 A1 | 12/2004 |

* cited by examiner

SUSPENSION LINK WITH INTEGRAL PIVOT ASSEMBLY

FIELD OF INVENTION

This invention relates to a suspension link for a vehicle. In particular, this invention relates to a suspension link having an integral pivot assembly.

BACKGROUND OF INVENTION

Vehicle suspension design has recently become increasingly complex due to greater demands from the user regarding a reduced tolerance for noise, vibration and/or harshness being transferred to the vehicle cabin from driveline or suspension components. Additionally, vehicles are becoming more commonly equipped with accessories such as power steering, power brakes, air conditioning, vehicle stability systems, anti-lock braking systems and the like. Each of these systems occupies space. Furthermore, power transmission systems have become increasingly complex with the advent of a variety of emission control systems and components as well as engine performance enhancing components. Based on these trends, space has become a premium.

In one known vehicle suspension design, a suspension member is equipped with a Watts-type linkage assembly. A pivot arm of the Watts linkage assembly is rotatably coupled to a suspension member in a cantilevered fashion such that the pivot arm is positioned adjacent to the suspension member. A first Watts link is coupled to a first end of the pivot arm and a second Watts link is coupled to an opposite end of the pivot arm. Because the pivot arm is longitudinally offset from the suspension member, each Watts link includes an offset arm portion connected to the pivot arm.

In at least one vehicle, the suspension member and the Watts linkage assembly are positioned between a well used to store a vehicle spare tire and a transmission housing. To maximize the amount of space available for adjacent components and/or storage areas, it may be desirable to minimize the volume of space occupied by the suspension components. Furthermore, it may be desirable to minimize or eliminate offset loading within the suspension components in an attempt to provide more robust structures.

SUMMARY OF INVENTION

The suspension assembly of the present disclosure includes a frame, a suspension link having first and second ends movably coupled to the frame, a pivot arm rotatably coupled to the suspension link, a first link and a second link. The pivot arm is positioned within a cavity formed in the suspension link. The first link is coupled to a first end of the pivot arm. The second link is coupled to a second end of the pivot arm.

In a first aspect of the invention, the pivot arm is a locking assembly. The locking assembly includes a fastener interconnecting first and second retainers. The suspension assembly further includes a first link being coupled to a first end of the pivot arm and a second link being coupled to a second end of the pivot arm.

The present disclosure also provides a suspension for a motor vehicle having a hollow suspension member including first and second spaced apart side walls and a locking assembly. The locking assembly includes the first retainer partially insertable through a first window formed in the first sidewall and a second retainer partially insertable through a second window formed in the second side wall. The first retainer engages the second retainer and includes two radially extending and axially spaced apart first and second flanges capturing a portion of the first sidewall therebetween.

In another form, a suspension for a motor vehicle includes a movable suspension link having a hollow portion with first and second spaced apart sidewalls. A pin is coupled to the suspension link and extends between the first and second sidewalls. A pivot arm is partially positioned within the hollow portion and rotatably supported by the pin. A first link is coupled to the first end of the pivot arm and a second link is coupled to a second end of the pivot arm.

A method of making a suspension assembly is also disclosed. The suspension assembly includes a first link with a first shell and a second shell, a pivot arm having a first half and a second half, and a pin. The method includes fixing the first shell to the second shell to define a pocket within the first link. The pin is coupled to the first link and extends through the pocket. The first half and the second half of the pivot arm are positioned at diametrically opposed locations adjacent the pin. The first and second halves are interconnected to define a pivot arm rotatably supported by the pin.

Further areas of applicability will become apparent from the description provided herein. It should be understood that the description and specific examples are intended for purposes of illustration only and are not intended to limit the scope of the present disclosure. In particular, it is contemplated that the claimed suspension may be used in conjunction with not only the Watts-type suspension previously described, but any suspension that connects the wheel carriers with a link such as a twist axle or a de Dion suspension.

BRIEF DESCRIPTION OF DRAWINGS

The drawings described herein are for illustration purposes only and are not intended to limit the scope of the present disclosure in any way.

DETAILED DESCRIPTION OF THE INVENTION

Figure 1:
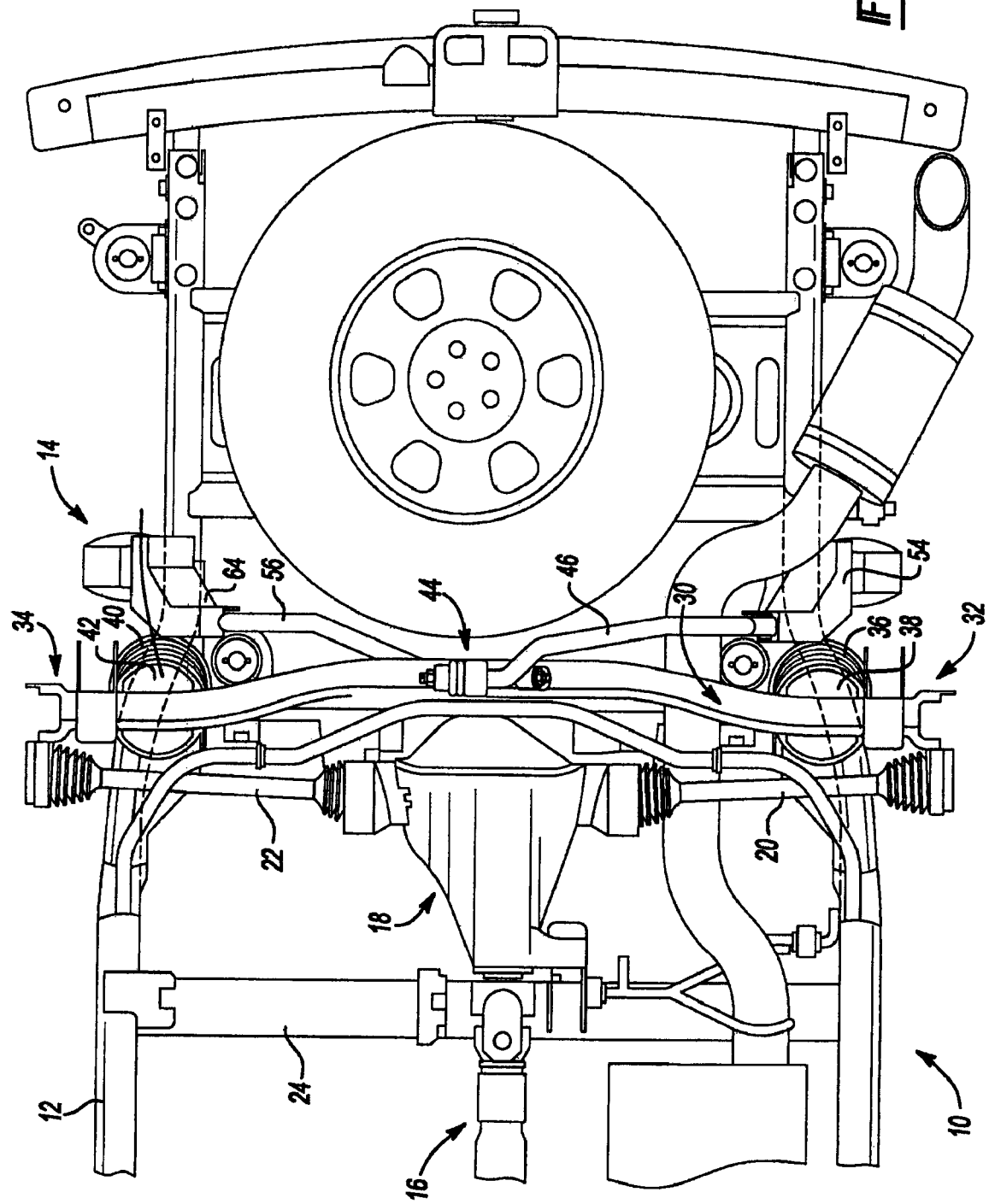
FIG. 1 is a partial bottom view of an exemplary vehicle equipped with a suspension described within the present disclosure.

The following description is merely exemplary in nature and is not intended to limit the present disclosure, application, or uses. It should be understood that throughout the drawings, corresponding reference numerals indicate like or corresponding parts and features.

With reference to FIG. 1, a portion of an exemplary vehicle 10 includes a frame 12 and a suspension assembly 14. A driveline 16 includes a transaxle 18 having a first output shaft 20 and a second output shaft 22. A cross member 24 is mounted to frame 12 and supports transaxle 18.

Suspension assembly 14 includes a compound link 30 having a first end 32 and a second end 34. A first spring 36 is positioned on a first spring seat 38 mounted to first end 32 of compound link 30. A second spring 40 is positioned on a second spring seat 42. Second spring seat 42 is fixed to second end 34 of compound link 30. First spring 36 and second spring 40 is each positioned between compound link 30 and frame 12. Accordingly, compound link 30 is movable relative to frame 12.

Figure 2:
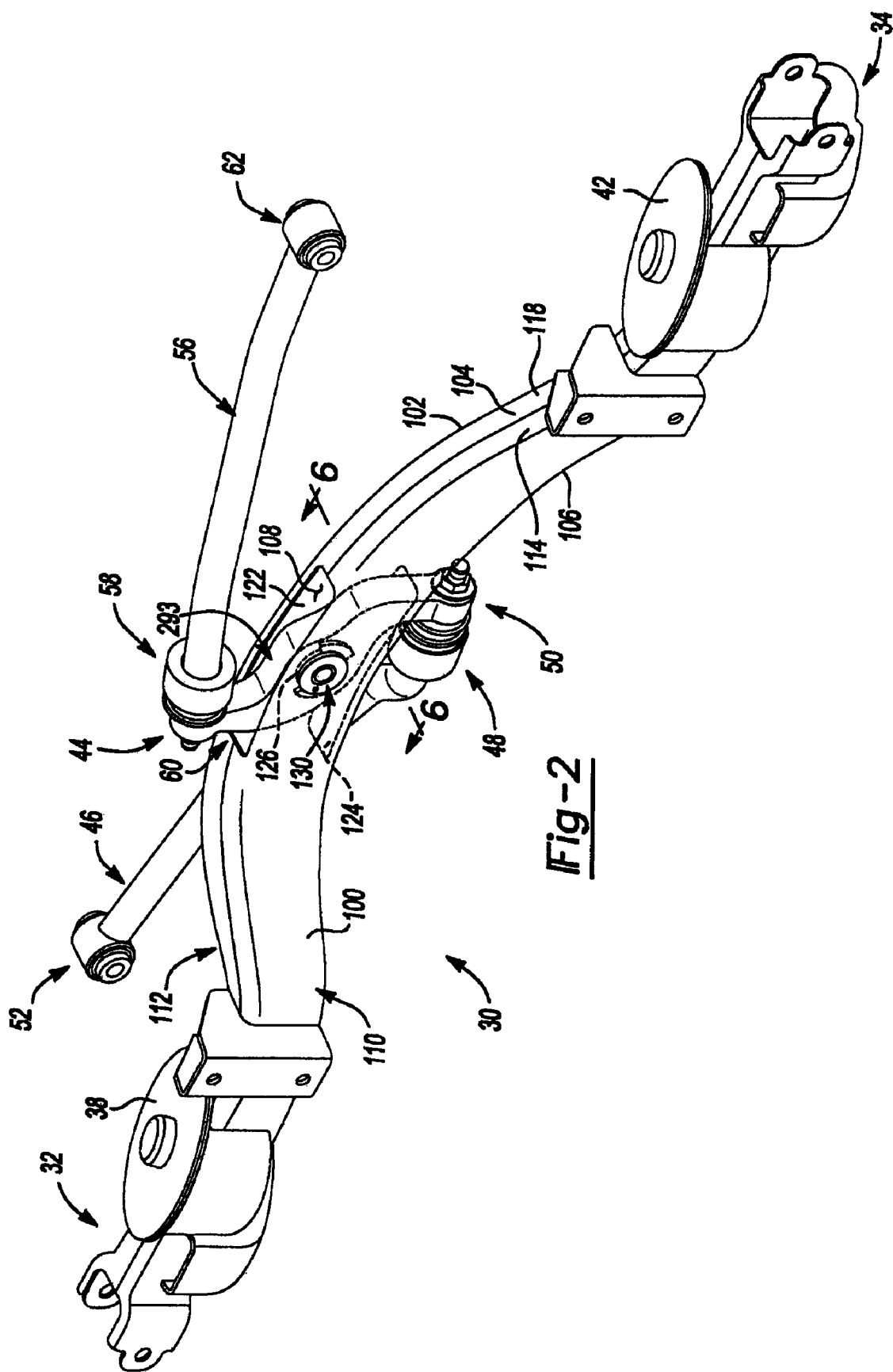
FIG. 2 is a perspective view of a portion of the suspension shown in FIG. 1 according to the present invention.

With reference to FIGS. 1 and 2, suspension assembly 14 also includes a pivot arm assembly 44 rotatably coupled to compound link 30. A first link 46 includes a first end 48 coupled to a first portion 50 of pivot arm assembly 44. A second end 52 of first link 46 is coupled to frame 12 via a bracket assembly 54. In similar fashion, a second link 56 includes a first end 58 coupled to a second portion 60 of pivot arm assembly 44. A second end 62 of second link 56 is coupled to frame 12 via a bracket assembly 64. During vehicle operation, compound link 30 moves relative to frame 12. In particular, first end 32 may move relative to frame 12 in the same or opposite direction and at the same or different magnitude as second end 34 moves relative to frame 12. Lateral movement of compound link 30 relative to frame 12 is limited by pivot arm assembly 44, first link 46 and second link 56.

As best shown in FIGS. 2 to 7, compound link 30 is a substantially hollow tubular structure having a substantially rectangular cross section. Compound link 30 includes a forward sidewall 100 and a rearward sidewall 102. A top wall 104 interconnects one edge of forward sidewall 100 with one edge of rearward sidewall 102. A bottom wall 106 interconnects opposite edges of forward sidewall 100 and rearward sidewall 102 to form a contiguously walled tube defining a cavity 108.

As shown, compound link 30 includes a first shell 110 welded to a second shell 112. First shell 110 is a substantially channel-shaped member including forward sidewall 100, a first lip 114 which forms a portion of top wall 104 and a second lip 116 which forms a portion of bottom wall 106. Forward sidewall 100 interconnects first lip 114 and second lip 116. Second shell 112 is substantially similar to first shell 110 and is a substantially channel-shaped member. Second shell 112 includes rearward sidewall 102, a third lip 118 and a fourth lip 120. Rearward sidewall 102 interconnects third lip 118 and fourth lip 120. Third lip 118 forms a portion of top wall 104 while fourth lip 120 forms a portion of bottom wall 106. Alternately, compound link 30 may be comprised of a single piece of tubular formed material instead of first shell 110 and second shell 112. The forming process may include a process such as hydro-forming.

An upper window 122 is formed in top wall 104 to provide clearance for second portion 60 of pivot arm assembly 44. A lower window 124 is formed in bottom wall 106 to provide clearance for first portion 50 of pivot arm assembly 44. A front window 126 is formed in forward sidewall 100 to provide clearance for a front retainer 128 of a twist lock retainer assembly 130. A rear window 132 is formed in rearward sidewall 102 to provide clearance for a rear retainer 134 of twist lock retainer assembly 130. Front window 126 is defined by first and second circumferentially spaced apart curved portions 135 and 136 having a first radius as well as third and fourth curved portions 138 and 140 having a second radius greater than the first radius. Each of the curved portions share a common center. Radially extending leg portions 141 interconnect the ends of the curved sections. Rear window 132 is substantially similar to front window 126 and includes first and second curved portions 142 and 143 having a first radius as well as third and fourth curved portions 144 and 146 having a second radius greater than the first radius and extending about a common center. Radially extending leg portions 147 interconnect the ends of the curved sections.

A web portion 148 of compound link 30 extends between lower window 124 and front window 126. Similar web portions 150, 152 and 154 extend between the remaining adjacent pairs of windows 122, 124, 126 and 132. It should be appreciated that compound link bending strength is maintained due to the use of uninterrupted web portions 148, 150, 152 and 154.

Figure 3A:
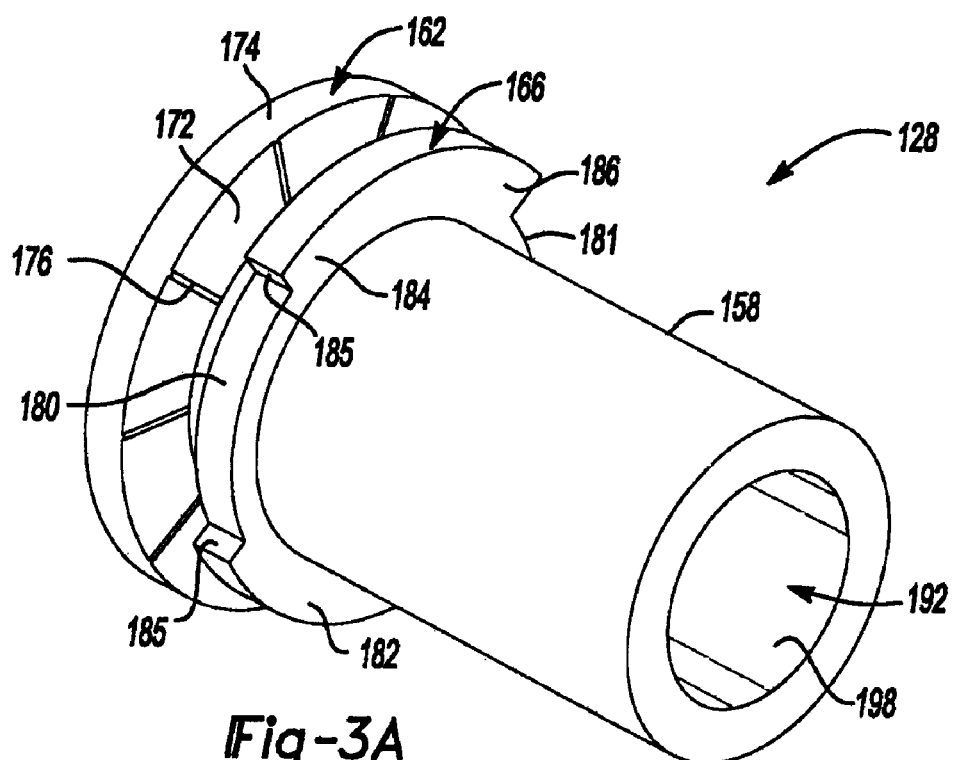
FIG. 3A is a perspective view of a portion of an exemplary twist lock assembly according to the present disclosure.
Figure 3B:
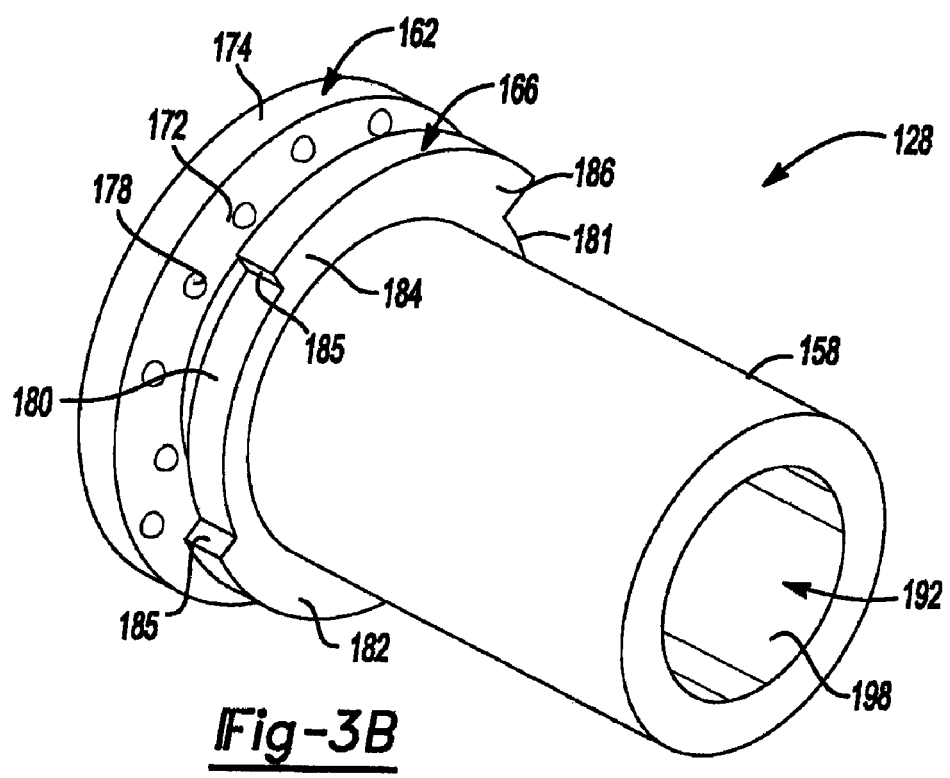
FIG. 3B is a perspective view of a portion of an alternate twist lock assembly according to the present disclosure.

Twist lock retainer assembly 130 acts as a pivot pin and pivotally supports the pivot arm 44. The twist lock assembly 130 is substantially cylindrically-shaped and includes front retainer 128, rear retainer 134, and a socket-head cap screw 156. Front retainer 128 includes a hollow cylindrical body 158, a circular base flange 162, a pilot portion 164 and a key flange 166. Circular base flange 162 includes an outer surface 170, an inner surface 172, and a circumferential surface 174 extending therebetween. Circular base flange 162 has an outer diameter larger than the largest opening within front window 126. As shown in FIGS. 3A and 3B, ribs 176 or protrusions 178 may be formed on inner surface 172 to enhance torque/clamp load capacity on forward sidewall 100 of compound link 30. Ribs 176 and protrusions 178 may be either raised or impregnated within circular base flange 162. A chamfer (not shown) may be formed at the intersection of inner surface 172 and circumferential surface 174 to ease installation of front retainer 128. The chamfer may be formed as a 15 degree lead and extend for approximately 1 to 2 mm radially inwardly about the entire circumference of circular base flange 162.

Key flange 166 is substantially similar in shape to front window 126 having first and second curved portions 180 and 181 with a first radius as well as third and fourth portions 182 and 184 with second larger radii. Radially extending surfaces 185 interconnect the adjacent curved portions. Key flange 166 is sized and shaped to clear front window 126 and enter cavity 108 at two angular orientations 180° apart. Key flange 166 also includes a front face 186 and a rear face 188. Key flange 166 is spaced apart from circular base flange 162 by pilot portion 164. Pilot portion 164 has an outer diameter smaller than circular base flange 162 and the curved portions of key flange 166. Pilot portion 164 has a length slightly greater than the thickness of forward sidewall 100. A chamfer (not shown) may be formed at the intersection of rear face 188 and portions 180, 181, 182 and 184. This chamfer may be sized similarly to the chamfer formed on circular base flange 162. Forward sidewall 100 may be more easily positioned between circular base flange 162 and key flange 166 if the chamfers are present.

An aperture 192 extends through front retainer 128. Aperture 192 includes a socket head clearance portion 194 having a first diameter, a main portion 196 having a second diameter, and a female locator portion 198 having a third diameter. Main portion 196 is sized to receive a body 200 of socket-head cap screw 156. Socket head clearance portion 194 is sized to receive a head 202 of socket-head cap screw 156 such that an outer face 204 of head 202 sits flush with outer surface 170 of circular base flange 162. Head 202 includes a hexagonally-shaped socket 206. Female locator portion 198 is sized to receive a male locator portion 210 of rear retainer 134.

Rear retainer 134 is configured substantially similar to front retainer 128 and includes a circular base flange 212, a pilot portion 214, a key flange 216, and cylindrically-shaped male locator portion 210. Circular base flange 212 includes an outer surface 218, an inner surface 220, and a circumferential surface 222. Inner surface 220 may also include ribs or protrusions (not shown) similar to ribs 176 or protrusions 178 to enhance torque/clamp load capacity on rearward sidewall 102 of compound link 30.

Key flange 216 is substantially similar in shape to rear window 132 having first and second curved portions 224 and 225 with a first radius as well as third and fourth curved portions 226 and 228 with second larger radii. Key flange 216 is sized and shaped to clear rear window 132 when properly aligned. Key flange 216 also includes a front face 230 and a rear face 232. Pilot portion 214 extends between circular base flange 212 and key flange 216 having a length slightly greater than the thickness of rearward sidewall 102.

An aperture 236 extends through rear retainer 134. Aperture 236 includes a hexagonally-shaped recess 238 and a main bore 240. Main bore 240 includes internal threads 242 sized to engage external threads 244 of socket-head cap screw 156. Recess 238 is sized to receive a hexagonally-shaped tool for applying counter torque to twist lock retainer assembly 130 while applying torque to socket-head cap screw 156.

It should be appreciated that the front retainer 128 and rear retainer 134 of twist lock retainer assembly 130 may be constructed from a number of materials. Specifically, it is contemplated that twist lock retainer assembly 130 includes mild steel either machined or formed by a powdered metal manufacturing method.

Pivot arm assembly 44 includes a split bearing 290 located to rotatably support a journal 292 of a pivot arm 293 on twist lock retainer assembly 130. Spit bearing 290 further includes a front half 294 and a rear half 296. Front half 294 includes a body section 298 and a flange 300. Rear half 296 also includes a body section 304 and a flange 306.

Pivot arm 293 further includes a cylindrical hub 310, a first arm 312, and a second arm 314. Cylindrical hub 310 includes journal 292, a front face 316, a rear face 318, and an outer face 320. First arm 312 extends from cylindrical hub 310 and includes a tapered aperture 322. Second arm 314 extends from cylindrical hub 310 and includes a tapered aperture 324.

Split bearing 290 functions as a multi-axial support member. Body sections 298 and 304 rotatably support journal 292 on cylindrical body 158 of twist lock retainer assembly 130 for rotation of pivot arm assembly 44 about axis $X_1$. Flange 300 spaces apart front face 316 of cylindrical hub 310 and front face 186 of key flange 166 axially along $X_1$ and reacts a thrust load therebetween. Flange 306 spaces apart rear face 318 of cylindrical hub 310 from front face 230 axially along $X_1$ and reacts a thrust load therebetween. It should be appreciated that pivot arm 293 may be constructed from a number of materials. Specifically, it is contemplated that pivot arm 293 is composed of either forged or cast steel or a polymer composite over-molded on a stiff steel inner-structure.

Pivot arm assembly 44 is placed in cavity 108 through either upper or lower window 122, 124 respectively. Pivot arm assembly 44 is positioned such that the center axis of cylindrical hub 310 is aligned with axis $X_1$. While maintaining this position, front retainer 128 is rotated until the shape of key flange 166 is aligned with the outline of front window 126. Key flange 166 is then inserted through front window 126 and split bearing 290. Front retainer 128 is next rotated 90° such that forward sidewall 100 is captured between circular base flange 162 and key flange 166. Movement of front retainer 128 relative to compound link 30 along axis $X_1$ is restricted.

Rear retainer 134 is inserted through rear window 132 such that male locator portion 210 is received by female locator portion 198. Rear retainer 134 is rotated to align key flange 216 with rear window 132. Key flange 216 is then further translated within cavity 108. Rear retainer 134 is next rotated 90° to capture rearward sidewall 102 between circular base flange 212 and key flange 216.

After front retainer 128 and rear retainer 134 are assembled together, socket-head cap screw 156 is inserted through front retainer 128 and threadingly engaged with rear retainer 134. Socket-head cap screw 156 is tightened to lock the front and rear retainers 128, 134 together. After tightening, pivot arm 293 is able to rotate relative to twist lock retainer assembly 130 about axis $X_1$.

Figure 4:
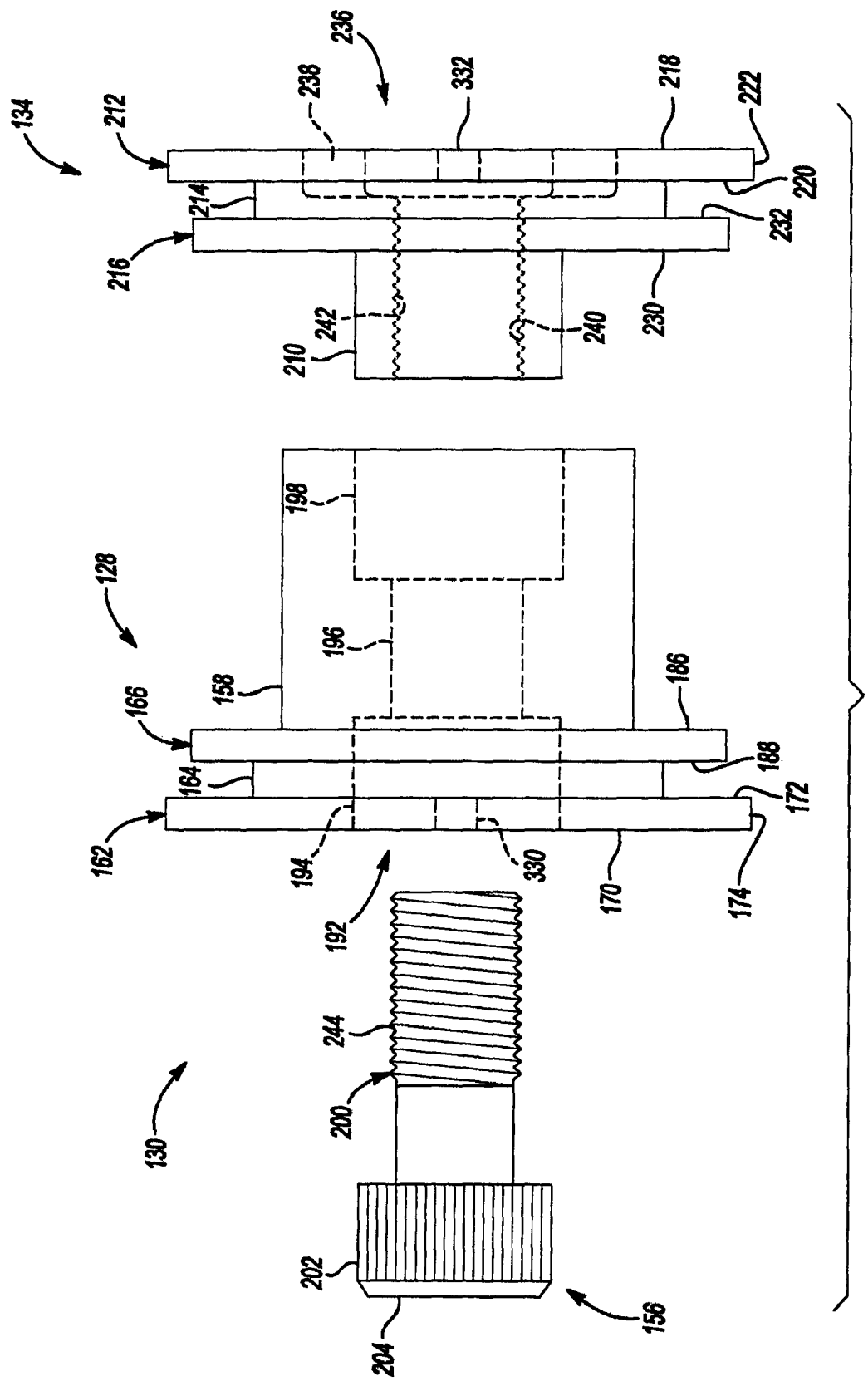
FIG. 4 is a side view of an exemplary twist lock assembly according to the present disclosure.
Figure 5:
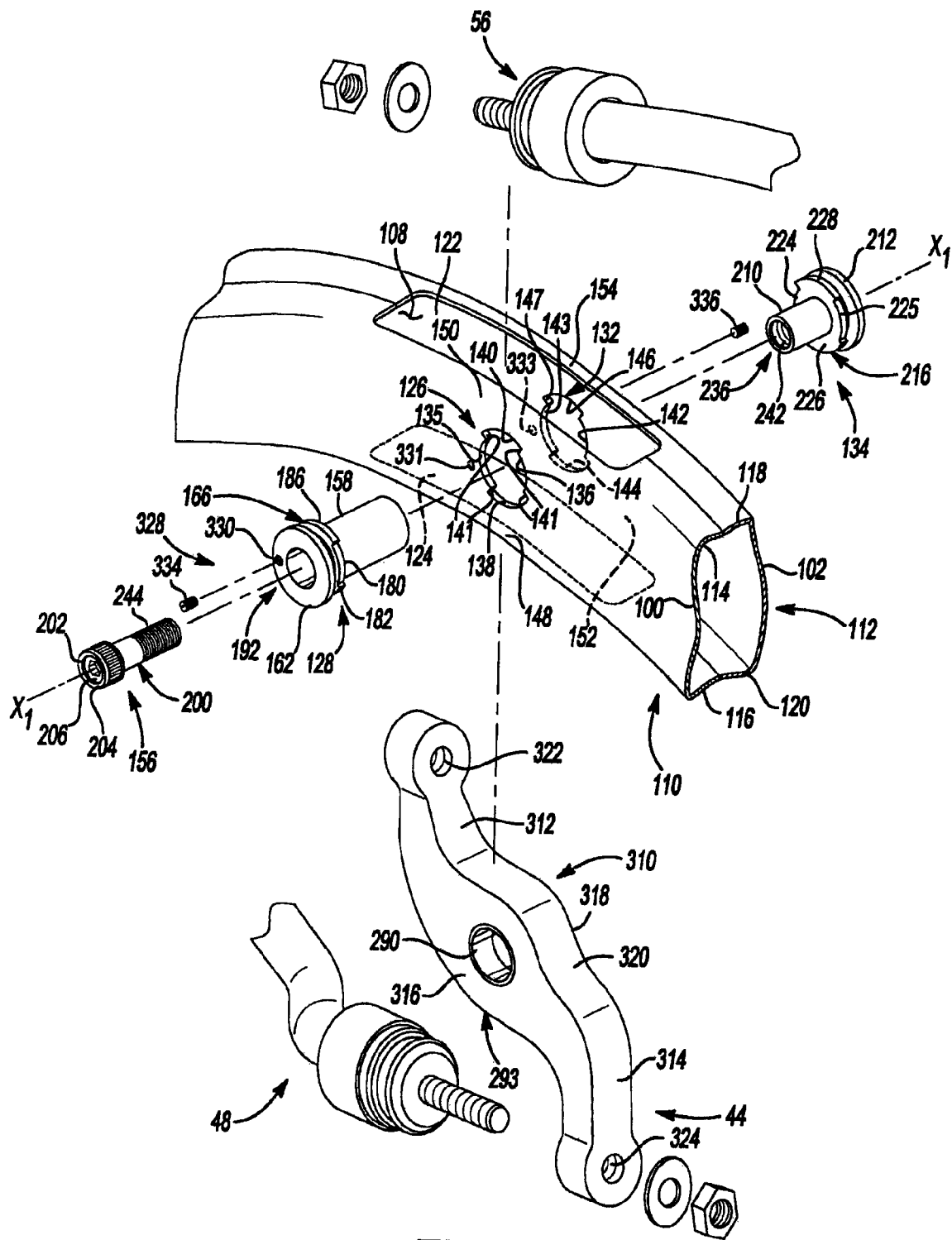
FIG. 5 is a partial fragmentary perspective view of the suspension having a portion of the compound link removed.
Figure 6:
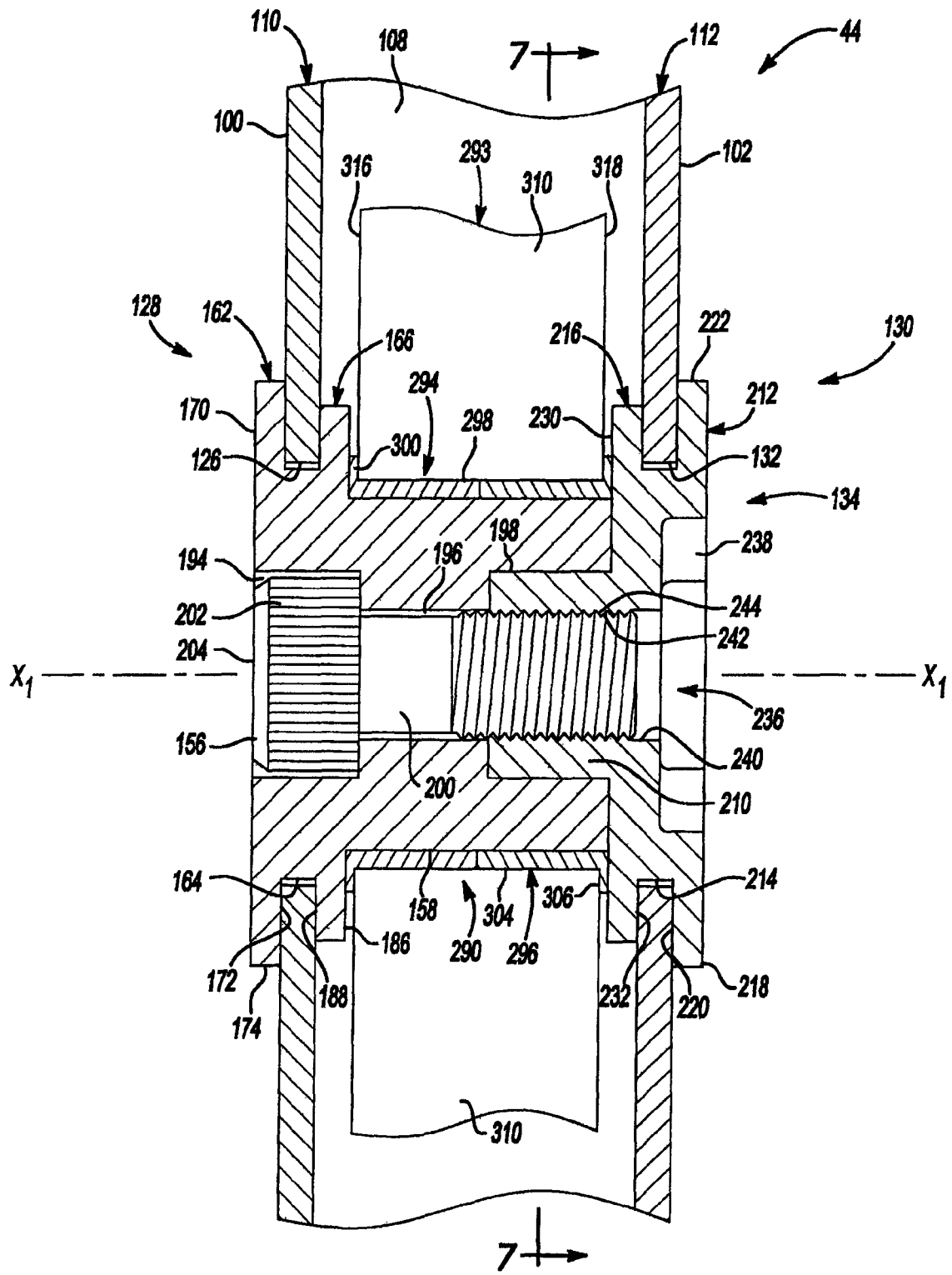
FIG. 6 is a partial fragmentary cross-sectional view of the suspension taken along line 6-6 as shown in FIG. 2.

Twist lock retainer assembly 130 may also include an anti-rotational lock system 328 as depicted in FIGS. 4 and 5. Anti-rotational lock system 328 includes a first threaded aperture 330 extending through circular base flange 162, a second threaded aperture 331 extending through forward side wall 100, a third threaded aperture 332 extending through circular base flange 212, a fourth aperture 333 extending through rearward sidewall 102, and machine screws 334 and 336. Machine screw 334 is threadingly engaged with at least one of apertures 330 and 331 and machine screw 336 is threadingly engaged with at least one of apertures 332 and 333 to prevent rotation of twist lock retainer assembly 130 about axis $X_1$.

Figure 7:
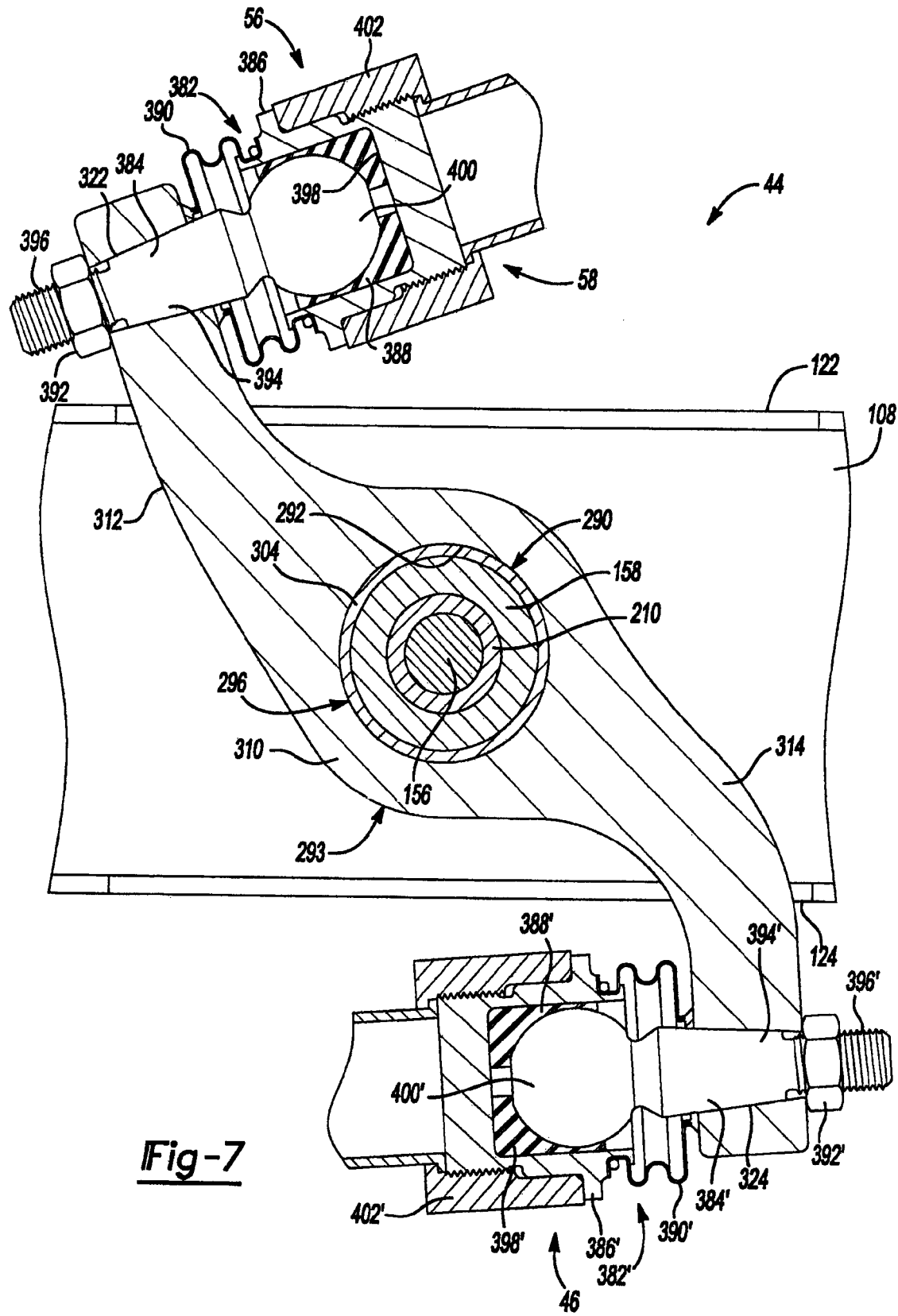
FIG. 7 is a partial fragmentary cross-sectional view of the suspension taken along line 7-7 shown in FIG. 6.

Second link 56 is coupled to first arm 312 of pivot arm assembly 44 via a ball stud assembly 382 as shown in FIG. 7. Ball stud assembly 382 includes a ball stud 384, a socket 386, a cushion 388, a seal 390 and a nut 392. Ball stud 384 includes a tapered shank 394 in engagement with tapered aperture 322. Nut 392 is threadingly engaged with a threaded portion 396 of shank 394 to mount ball stud 384 to first arm 312. Cushion 388 is positioned within a pocket 398 formed within socket 386. A ball portion 400 of ball stud 384 is also positioned within pocket 398 and supported by cushion 388. A collar 402 couples first end 58 of second link 56 to ball stud assembly 382. Seal 390 engages socket 386 and ball stud 384 to prevent ingress of contamination into pocket 398.

First link 46 is coupled to pivot arm assembly 44 via a ball stud assembly 382'. Ball stud assembly 382' is substantially similar to ball stud assembly 382. Accordingly, like elements are identified with similar reference numerals including a "prime" suffix. The interconnection of first link 46 with pivot arm assembly 44 is substantially similar to the interconnection of second link 56 with pivot arm assembly 44. Accordingly, a repetitive description will not be provided.

Figure 8:
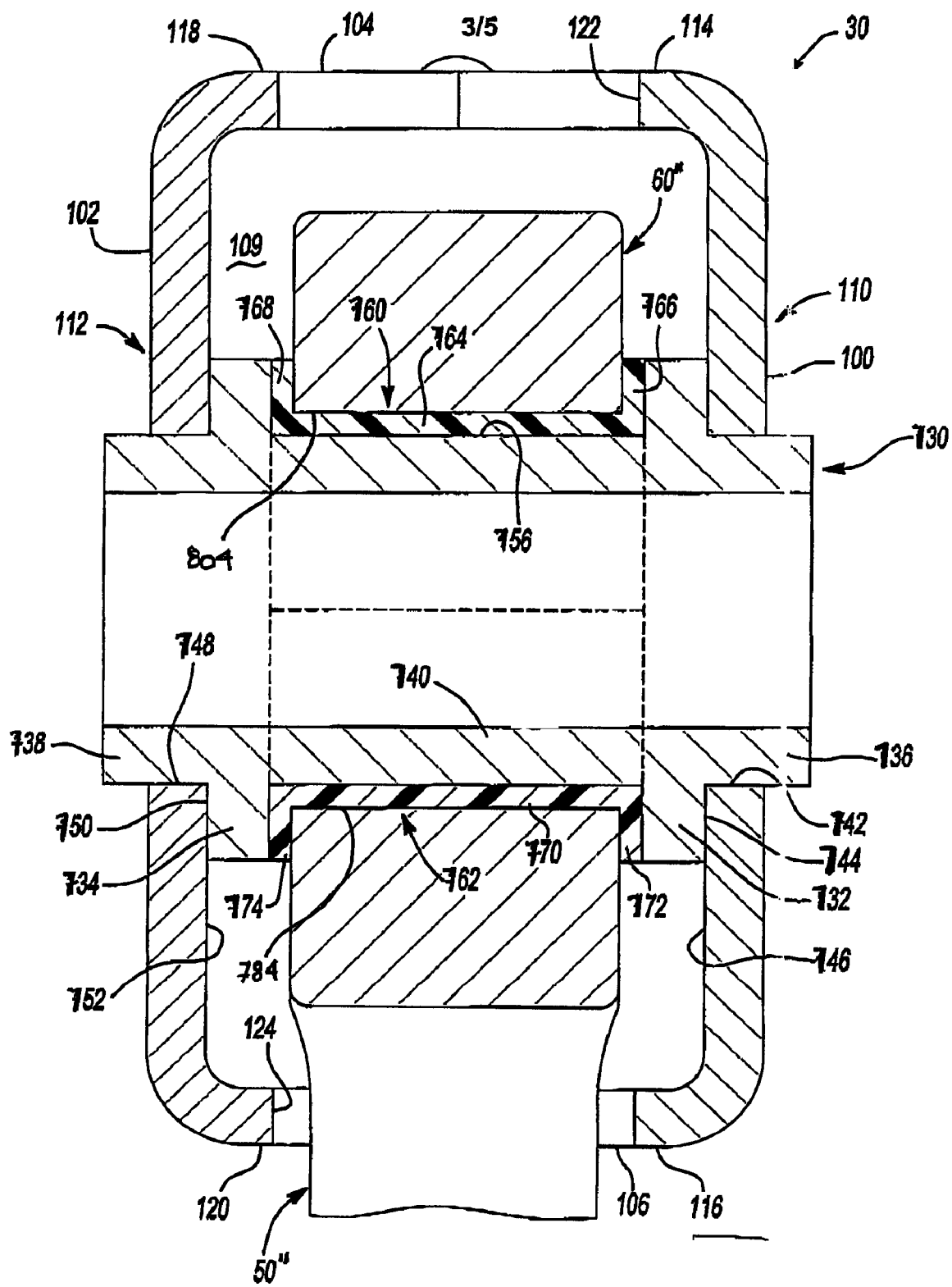
FIG. 8 is a cross-sectional view of suspension taken along line 8-8 shown in FIG. 9 according to an alternate aspect of the present invention.
Figure 9:
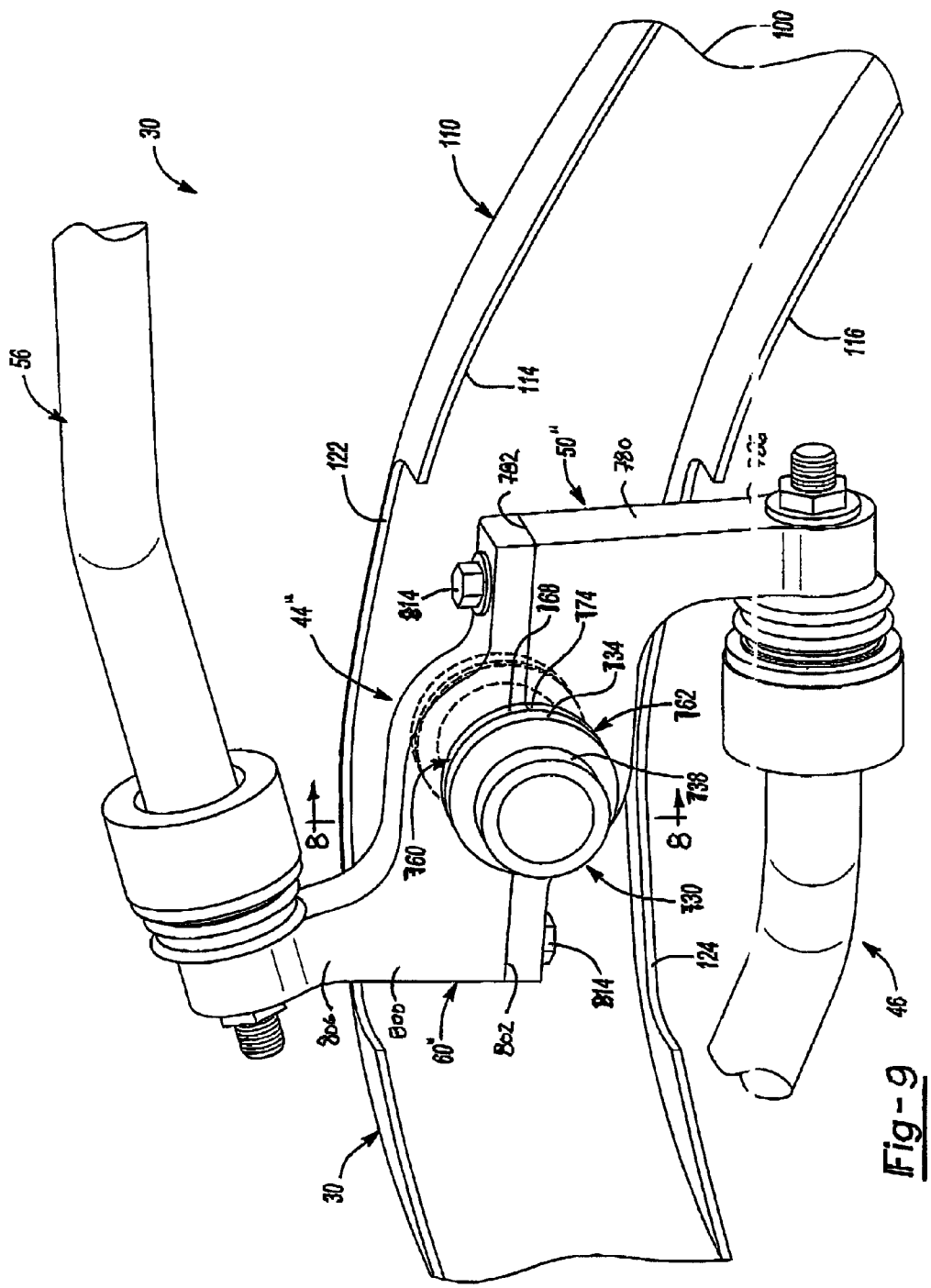
FIG. 9 is a partial fragmentary perspective view of the suspension of FIG. 8 having a portion of the compound link removed.

Referring to FIGS. 8 and 9, an alternate embodiment of the pivot assembly 44" is illustrated. In this embodiment, the pivot pin is a pin 730 that is positioned within cavity 109 and coupled to forward sidewall 100 and rear sidewall 102. Pin 730 is a substantially cylindrically shaped hollow member having first and second radial extending flanges 732, 734. A first pilot portion 736 outwardly extends beyond first flange 732. A second pilot portion 738 outwardly extends beyond second flange 734. A central support or hub portion 740 extends between first flange 732 and second flange 734.

First pilot portion 736 extends through an aperture 742 that is formed in forward sidewall 100. A land 744 of first flange 732 engages an inner surface 746 of first shell 110. In similar fashion, second pilot portion 738 extends through an aperture that is 748 formed in rearward sidewall 102. A land 750 engages an inner surface 752 of second shell 112. First flange 732 and second flange 734 are spaced apart a predetermined distance to properly position first shell 110 relative to second shell 112 prior to welding the shells together. It should be appreciated that pin 730 may be constructed from a number of materials and may be coupled to compound link 30 using a variety of manufacturing techniques. Specifically, it is contemplated that pin 730 is an extruded member constructed from cold rolled steel. Pin 730 may alternatively be solid.

Furthermore, it is contemplated that pin 730 is welded to rearward sidewall 102 prior to first shell 110 being welded to second shell 112. After pin 730 has been fixed to rearward sidewall 102, aperture 742 is aligned with first pilot portion 736 of hollow pin 730 such that a portion of hollow pin 730 extends therethrough. At this time, first shell 110 is welded to or otherwise fixed to second shell 112. It is contemplated that first shell 110 and second shell 112 are steel members shaped by stamping, hydro-forming or another applicable metal forming process.

Pivot arm assembly 44" is rotatably supported on an outer surface 756 of pin 730 by a split bearing 758. Spit bearing 758 includes an upper half 760 and a lower half 762. Upper half 760 includes a body section 764 positioned between first and second end flanges 766, 768 respectively. Lower half 762 also includes a body section 770 as well as first and second end flanges 772, 774.

First half 50" includes a body portion 780 having a mounting plane 782 and a journal 784. First half 50" also includes an arm portion 786 extending substantially perpendicular to mounting plane 782.

Second half 60" is shaped substantially similarly to first half 50" and includes a body portion 800, a mounting plane 802, a journal 804 and an arm portion 806.

First half 50" and second half 60" are coupled to one another by fasteners 814. Upper half 760 engages journal 804 and rotatably supports first half 50" while lower half 762 engages journal 784 and rotatably supports second half 60" on pin 730. It should be appreciated that pivot arm assembly 44" is constructed in the multi-piece arrangement previously described to allow mounting of first half 50" and second half 60" to pin 730 after first shell 110 has been fixed to second shell 112. Upper window 122 and lower window 124 are sized and positioned to allow upper split bearing half 760, first half 50", lower split bearing half 762 and second half 60" to be positioned within cavity 109 by translating the components from positions outside of compound link 30. Furthermore, windows 122 and 124 are sized to allow a tool to access fasteners 814 and apply torque thereto.

At this level of assembly, pivot arm assembly 44" is rotatably mounted to pin 730 and positioned such that first half 50" and second half 60" are longitudinally positioned between forward sidewall 100 and rearward sidewall 102. In this manner, pivot arm assembly 44" maximizes the available space within cavity 109 and does not protrude beyond the outer surface of either forward sidewall 100 or rearward sidewall 102. First flange 732 and second flange 734 maintain the longitudinal position of pivot arm assembly 44".

First link 46 is coupled to arm portion 786 of first half 50" via a ball stud assembly as previously described. Similarly, second link 56 is coupled to arm portion 806 of second half 60" via a ball stud assembly.

Furthermore, the foregoing discussion discloses and describes merely exemplary embodiments of the present invention. One skilled in the art will readily recognize from such discussion, and from the accompanying drawings and Claims, that various changes, modifications and variations may be made therein without department from the scope of the invention as defined in the following Claims.

What is claimed is:

1. A suspension for a motor vehicle, comprising:
 a moveable suspension link having a hollow portion with first and second spaced apart sidewalls;
 a pivot pin extending between the first and second sidewalls; and
 a pivot arm partially positioned within the hollow portion and rotatably supported by the pivot pin, the pivot arm including a first end portion and a second end portion, the first end portion extending outwardly from the hollow portion via a first side of the moveable suspension link and the second end portion extending outwardly from the hollow portion via a second side of the moveable suspension link that is opposite the first side, each one of the first and second end portions of the pivot arm extending up to approximately a same maximum distance away from the pivot pin.

2. The suspension of claim 1, wherein the first and second end portions of the pivot arm are substantially centered between a first plane containing the first sidewall and a second plane containing the second sidewall.

3. The suspension of claim 2 wherein the first and second sidewalls are interconnected at one edge by a third wall and at an opposite edge by a fourth wall.

4. The suspension of claim 3, wherein the first portion of the pivot arm extends through an aperture formed in the third wall and the second portion of the pivot arm extends through an aperture formed in the fourth wall.

5. The suspension of claim 1 wherein the pivot pin includes a first radially extending flange in engagement with one of the first and second sidewalls.

6. The suspension of claim 5 wherein the pivot pin includes a second radially extending flange spaced apart from the first flange, the second flange being in engagement with the other of the first and second sidewalls.

7. The suspension of claim 6 wherein the pivot arm includes a first half secured to a second half, the first and second halves engaging one another along a plane that intersects the pivot pin.

8. The suspension of claim 7 further including a split bearing positioned between the first and second pivot arm halves and the pivot pin.

9. The suspension of claim 8 wherein the suspension further comprises a first link being coupled to the first end portion of the pivot arm, and a second link being coupled to the second end portion of the pivot arm.

10. The suspension of claim 9 wherein each of the first and second links includes a ball joint for coupling the first and second links to the pivot arm.

11. The suspension of claim 1, wherein the pivot pin is a locking assembly including a first retainer and a second retainer, wherein the first retainer lockingly engages the second retainer to engage the first and second sidewalls and present a bearing surface rotatably receiving said pivot arm.

12. The suspension of claim 11 wherein the pivot arm is formed from a single, contiguous material.

13. The suspension of claim 12, further including a split bearing positioned to support the pivot arm on the locking assembly.

14. The suspension of claim 11 wherein the first retainer includes two radially extending and axially spaced apart flanges capturing a portion of the suspension link therebetween.

15. The suspension of claim 14 wherein one of the flanges is irregularly-shaped to correspond to a first irregularly-shaped window formed in the suspension link.

16. The suspension of claim 15 wherein the second retainer includes two radially extending and spaced apart flanges capturing a different portion of the suspension link therebetween.

17. The suspension of claim 16 wherein a fastener joins the first and second retainers.

18. The suspension of claim 11, wherein the first retainer partially extends through a first window formed in the first sidewall and the second retainer partially extends through a second window formed in the second sidewall.

19. The suspension of claim 18, wherein the first retainer includes a first flange shaped to correspond to a shape of the first window, wherein the first retainer is rotatable to align the first flange with the first window to allow entry of the first retainer into the hollow portion.

20. The suspension of claim 19, wherein the first retainer is rotatable to misalign the first flange and the first window and resist removal of the first flange from the hollow portion.

21. The suspension of claim 20, wherein the first retainer includes a bore receiving a portion of the second retainer.

22. The suspension of claim 20 wherein a fastener joins the first and second retainers.

23. The suspension of claim 22, wherein the second retainer includes a second flange shaped to correspond to a shape of the second window, wherein the second retainer is rotatable to align the second flange with the second window to allow entry of the second retainer into the hollow portion.

24. The suspension of claim 23, wherein the second retainer is rotatable to misalign the second flange and the second window and resist removal of the second flange from the hollow portion.

25. A suspension for a motor vehicle, comprising:
a moveable suspension link having a hollow portion with first and second spaced apart sidewalls that are interconnected at one edge by a third wall and at an opposite edge by a fourth wall;
a pivot pin extending between the first and second sidewalls; and
a pivot arm partially positioned within the hollow portion and rotatably supported by the pivot pin, the pivot arm including first and second end portions extending outwardly from the hollow portion and being substantially centered between planes containing the first and second sidewalls,
wherein the first portion of the pivot arm extends through an aperture formed in the third wall and the second portion of the pivot arm extends through an aperture formed in the fourth wall.

26. A method of making a suspension assembly having a tubular link with first and second spaced apart sidewalls that are interconnected at one edge by a third wall and at an opposite edge by a fourth wall, a pivot arm and a locking assembly having first and second retainers as well as a fastener, the method comprising:
positioning the pivot arm within a cavity formed in the tubular link such that a first end portion of the pivot arm extends outwardly from the cavity through an aperture formed in the third wall and a second end portion of the pivot arm extends outwardly from the cavity via an aperture formed in the fourth wall;
inserting a portion of the first retainer through a first window formed in the first sidewall;
inserting a portion of the second retainer through a second window formed in the second sidewall; and
interconnecting the first and second retainers with the fastener to present a pivot pin for rotatably supporting the pivot arm.

27. A method of making a suspension assembly having a tubular link with first and second spaced apart sidewalls, a pivot arm and a locking assembly having first and second retainers as well as a fastener, the method comprising:
positioning the pivot arm within a cavity formed in the tubular link such that a first end portion of the pivot arm extends outwardly from the cavity via a first side of the tubular link and a second end portion of the pivot arm extends outwardly from the cavity via a second side of the tubular link that is opposite the first side;
inserting a portion of the first retainer through a first window formed in the first sidewall;
inserting a portion of the second retainer through a second window formed in the second sidewall; and
interconnecting the first and second retainers with the fastener to present a pivot pin for rotatably supporting the pivot arm,
wherein each one of the first and second end portions of the pivot arm extend up to approximately a same maximum distance away from the pivot pin.

28. The method of claim 27 further including positioning a portion of the second retainer within a bore formed in the first retainer.

29. The method of claim 28 further including aligning a key-shaped flange of the first retainer with the first window prior to inserting the portion through the first window and subsequently rotating the first retainer to misalign the flange and the first window to retain the first retainer within the cavity.

30. A suspension for a motor vehicle, comprising:
a moveable suspension link having a hollow portion with first and second spaced apart sidewalls;
a pivot pin extending between the first and second sidewalls; and
a pivot arm partially positioned within the hollow portion and rotatably supported by the pivot pin;
wherein the pivot pin includes a first radially extending flange in engagement with one of the first and second sidewalls;
wherein the pivot pin includes a second radially extending flange spaced apart from the first flange, the second flange being in engagement with the other of the first and second sidewalls;
wherein the pivot arm includes a first half secured to a second half, the first and second halves engaging one another along a plane that intersects the pivot pin.

31. The suspension of claim 30 further including a split bearing positioned between the first and second pivot arm halves and the pivot pin.

32. The suspension of claim 31 wherein the suspension further comprises a first link being coupled to a first end of the pivot arm, and a second link being coupled to a second end of the pivot arm.

33. The suspension of claim 32 wherein each of the first and second links includes a ball joint for coupling the first and second links to the pivot arm.

34. A method of making a suspension assembly having a suspension link with a first shell and a second shell, a pivot arm having a first half and a second half and a pivot pin, the method comprising:
fixing the first shell to the second shell to define a cavity within the suspension link;
coupling the pin to the suspension link, the pivot pin extending through the cavity;
positioning the first half and the second half at diametrically opposed positions adjacent the pivot pin; and interconnecting the first and second halves to define a pivot arm rotatably supported by the pivot pin.

35. The method of claim 34 further including positioning a portion of the first half outside of the pocket adjacent a first side of the suspension link and positioning a portion of the second half outside of the cavity adjacent a second opposite side of the first link.

36. The method of claim 35 further including coupling a first link to the portion of the first half and coupling a second link to the portion of the second half.

37. The method of claim 36 further including longitudinally positioning the first and second halves between vertical sidewalls of the first and second shell.

38. The method of claim 37 wherein the pivot pin is coupled to one of the first and second shells prior to fixing the first shell to the second shell.

\* \* \* \* \*